United States Patent [19]
Christopher, Jr. et al.

[11] 3,709,297
[45] Jan. 9, 1973

[54] PETROLEUM RECOVERY PROCESS

[75] Inventors: Charles A. Christopher, Jr.; Henry J. Grimm; Alton J. Nute, all of Houston, Tex.

[73] Assignee: Texaco Inc., New York, N.Y.

[22] Filed: Dec. 28, 1970

[21] Appl. No.: 102,134

[52] U.S. Cl. ................. 166/273, 166/274, 166/275
[51] Int. Cl. .................................................. E21b 43/22
[58] Field of Search......166/246, 271, 273, 274, 275, 166/307, 305 R; 252/8.55 D

[56] References Cited

UNITED STATES PATENTS

| | | | |
|---|---|---|---|
| 3,529,669 | 9/1970 | Tietz | 166/307 |
| 3,039,529 | 6/1962 | McKennon | 166/275 |
| 2,827,964 | 3/1958 | Sandiford et al. | 166/275 X |
| 3,482,636 | 12/1969 | Crowe | 166/307 |
| 3,556,221 | 1/1971 | Haws | 166/305 R |
| 3,372,748 | 3/1968 | Cook | 166/246 |
| 3,370,649 | 2/1968 | Wogelmuth | 166/274 |

*Primary Examiner*—Stephen J. Novosad
*Attorney*—Thomas H. Whaley and Carl G. Reis

[57] ABSTRACT

An improved oil recovery method is disclosed in which a slug of a dilute aqueous polymer solution is injected into a subterranean oil-containing formation through one or more injection wells followed by a slug of dilute aqueous solution of an alkali metal hypochlorite. Optionally, either or both of the injected solutions may contain a surfactant. In a final step, water is injected to drive the polymer and hypochlorite solutions through the formation and oil is recovered from the formation through at least one spaced production well.

21 Claims, No Drawings

PETROLEUM RECOVERY PROCESS

BACKGROUND OF THE INVENTION

1. Field of the Invention

This invention pertains to the recovery of petroleum from subterranean oil-bearing formations and, more particularly, this invention relates to a process for recovering oil from a subterranean formation by flooding the formation with water.

2. DESCRIPTION OF THE PRIOR ART

Oil found within a subterranean formation is recovered or produced through wells, called production wells, which are drilled into the subterranean formation. Generally, a large amount of the oil is left in the formation if it is produced only by primary depletion, i.e., where only formation energy is employed in recovering the oil. Only a small fraction of the original oil-in-place in a hydrocarbon-bearing reservoir is expelled by primary production or natural mechanisms. Where the initial formation energy is inadequate or has become depleted through production from the well, supplemental processes, sometimes referred to as secondary recovery operations, are utilized in order to recover a larger percentage of the in-place oil. Typically, a reservoir retains about half of it original oil even after the application of currently available secondary recovery methods. There is, therefore, a need for improved recovery methods in which the ultimate yield of the petroleum from the natural reservoirs will be substantially increased.

In a very successful and widely used oil recovery method, a fluid is injected through an injection means comprising one or more injection wells and displaced into the producing formation. Oil contained within the formation moves through the formation and is produced from a production means, such as one or more production wells, as the injected fluid passes from the injection means toward the production means. Water is generally employed as injected fluid and the operation is, therefore, referred to as a water flood. This injected water is referred to as a flooding liquid, flooding water or flooding medium as distinguished from the in-situ or connate water.

Although water flooding as currently practiced is effective in obtaining additional quantities of oil from the subterranean oil-bearing strata, it has a number of shortcomings. For example, there is a tendency of the flooding water to "finger" through an oil-containing formation and to bypass substantial portions of it. Fingering is a term used to refer to the development within the formation of the unstable bulges or stringers by which the flooding medium moves towards the production wells more rapidly than through the remainder of the formation. Also, water does not normally displace as much oil in the portions of the formation with which it comes in contact as it potentially is capable of doing.

It is known that water floods perform less satisfactorily with viscous oils than with relatively non-viscous oils. It has been found that the fingering and bypassing tendencies of the water in such water flood processes are more or less directly related to the ratio of the viscosity of the oil to the viscosity of the flooding water. Therefore, it has been proposed in a number of art-recognized processes to restrict the mobility of the water to no greater than the mobility of the oil by adding water-thickening agents in order to increase the viscosity of the water and cause previously uninvaded portions of the reservoir to be swept by the water. Mobility is generally defined as a relative permeability which the formation has for a particular fluid divided by the viscosity of the fluid. A number of agents have been employed for increasing the viscosity of the flooding water including water-soluble, high molecular weight polymers. One disadvantage of such polymers is that they are adsorbed on the formation surfaces and may alter the permeability through the rock capillaries, so that flood water injected behind the polymer slug tends to finger through the formation, and eventually through the polymer slug itself. This fingering of "after-flood" water may be considerably reduced if the polymer is removed from the rock matrix subsequent to the passage of the polymer slug.

Adsorption of polymers onto the rock matrix may increase the pressure drop required to move the polymer slug through the formation over that of a waterflood, resulting in increased injection well pressures.

Likewise, the addition of surface active agents, or "surfactants" to the waterflooding medium for the purpose of lowering the interfacial tension between the water and the oil-in-place in the reservoir, thereby increasing the ultimate recovery of oil displaced by the waterflood, has been proposed. Here again, it has been found that many of the surfactants employed in the art are susceptible to depletion within the formation and this depletion occurs through adsorption of the surfactants on the rock matrix. Also, precipitation of the surfactant by reaction with the undesirable bivalent cations in the formation water, such as $Ca^{++}$ or $Mg^{++}$ may occur.

It is an object of this invention, therefore, to provide an improved process for the recovery of oil from subterranean oil-bearing formations.

A further object of this invention is to provide an improved waterflooding process in which both mobility control of the flooding medium and increased displacement of the residual oil and achieved.

Another object of this invention is to improve the injectivity of the polymer-surfactant flooding process.

Another object of this invention is to provide a highly efficient petroleum recovery process which utilizes relatively inexpensive mobility control ingredients.

SUMMARY OF THE INVENTION

In accordance with this invention, it has been found that oil can be recovered from an oil-containing subterranean formation having an injection means and a production means completed therein by a process comprising the following steps:

a. injecting a slug of a dilute aqueous polymer solution through the injection means into the subterranean oil-bearing formation, b. injecting a slug of a dilute aqueous alkali metal hypochlorite solution through the injection means into the subterranean formation, c. injecting water to drive the hypochlorite and the polymer solutions together with the oil within the formation toward the production means, and d. recovering crude oil through the production means.

The viscous aqueous polymer solution is injected through one or more injection or input wells penetrating the oil-bearing formation and forced through the formation towards at least one production or output well which, likewise, is completed in the formation. The mobile oil in the formation is displaced as the flooding medium passes through it and the medium carries the mobile oil into the producing well from where it can be recovered by any conventional means. The injection and production wells can be arranged in any convenient pattern, such as the conventional "five-spot" pattern in which a central producing well is surrounded by four symmetrically located injection wells. Likewise, the "line-drive" pattern in which the injection wells are arranged in a line so that the injected flooding medium advances through the formation to displace oil towards one or more spaced production wells that can also be arranged in a line substantially parallel to the line of injection wells can be employed.

In another embodiment, the process of this invention can comprise only steps a and b above which can be repeated as often as desired in order to displace the in-place oil in the subterranean formation toward the production means and afterwards recovering the crude oil through the production means. Likewise, in another embodiment of this invention, steps a and b can be repeated as often as desired followed by step c.

It will be apparent to those skilled in the art that the improved waterflooding process of this invention can be employed conjunctively with one or more of the other well-known secondary or tertiary recovery techniques commonly utilized.

DETAILED DESCRIPTION OF THE INVENTION

Surprisingly, it has been found that when the injection of a slug of the aqueous polymer solution into the producing formation is followed by injection of a slug of a dilute aqueous alkali metal hypochlorite solution into the formation that the production of oil therefrom is substantially increased over that which is obtained when the flooding operation utilizes only the injection of the dilute aqueous polymer solution. Among the advantages of this invention are that it may be used as a secondary or tertiary method; that it increases the displacement efficiency of the flood due to the action of the alkali metal hypochlorite and that it increases sweep efficiency due to the reduced mobility of the polymer solution.

Preferably, the trailing edges of the slugs should not be abrupt but should be blended into the leading edge of the following slug to prevent fingering of the following slug into the leading slug. Optionally, either the dilute aqueous polymer solution or the dilute aqueous alkali metal hypochlorite solution can contain a surfactant or both of the injected solutions may contain surfactants which can be the same or different.

The concentration of the alkali metal hypochlorite in the hypochlorite solution generally will be from about 0.01 percent to about 10 percent by weight and, preferably, from about 0.5 percent to about 2 percent by weight. Useful alkali metal hypochlorites include sodium, lithium and potassium.

The dilute aqueous polymer solution which may or may not contain a surfactant is injected in a volume sufficient to divert the flooding water into uninvaded portions of the producing formation. Usually, a volume of at least 1 percent of the pore volume is required and, ordinarily, a volume no greater than about 50 percent of the pore volume is required.

Preferably, a volume of the aqueous polymer solution of at least 10 percent to about 35 percent of the pore volume of the reservoir to be swept is utilized. Larger volumes of the dilute aqueous polymer solution may be employed but ordinarily such an operation is not profitable.

Generally, a volume of the alkali metal hypochlorite solution of at least about 1 percent of the pore volume is needed and, ordinarily, a maximum of about 50 percent of the pore volume is required. Preferably, about 10 to about 25 percent of the pore volume of the formation of the aqueous hypochlorite solution is injected into the producing formation through the injection means. As with the injection of the aqueous polymer solution, a volume of the hypochlorite solution greater than the volume set forth above may be employed but ordinarily such operations are unprofitable. Preferably, the volume of hypochlorite solution injected is about 50 percent of the volume of the aqueous polymer solution utilized although lesser or larger volumes of the hypochlorite solution may be employed, if desired.

The mobility control additive used in the process of this invention in the dilute aqueous polymer solution is of the class of water-soluble, essentially linear, high molecular weight acrylic amide polymers. An especially useful group of polymers include high molecular weight acrylamide polymers having from about 2 to about 70 and, preferably, from about 5 to about 50 mol percent of the carboxamide groups in the polymer hydrolyzed to carboxyl groups.

The concentration of the polymer in the dilute aqueous polymer solution can be varied over a wide range, although, generally, it will be from about 0.005 up to about 0.7 percent by weight and, preferably, it will be from about 0.01 to about 0.15 percent by weight.

Acrylic amide polymers suitable for use in this invention include the high molecular weight, homopolymers of acrylamide and methacrylamide together with high molecular weight water-soluble copolymers of these materials with other suitable monoethylenically unsaturated monomers copolymerizable therewith. The useful acrylic amide polymers are vinyl type polymers which have substantial linearity, i.e., they have little or no cross-linking between the polymer chains. Such polymeric materials disperse in water to provide homogeneous and transparent solutions which can, for all practical purposes, be diluted indefinitely.

The molecular weight of the polymers useful in this invention will vary from about 100,000 up to about 10,000,000 or more as determined from light scattering data. Preferably, polymers having a molecular weight or over 1,000,000 are employed.

Specific examples of acrylic amide polymers, in addition to the forementioned homopolymers, are water-soluble copolymers of acrylamide or methacrylamide with comonomers containing water-solubilizing moieties as, for example, acrylic acid, methacrylic acid, maleic acid, alkali metal salts of such acids, vinylbenzyl compounds (such as trimethylvinylbenzylammonium chloride), vinylbenzenesulfonic acid, 2-sulfoethyl acrylate, 2-aminoethylacrylate, N-vinyloxazolidone, N-vinylpyrrolidone, N-vinylmorpholinone, etc. In the copolymers, the comonomer may constitute up to about 50 mole percent of the finished polymer. Comonomers that are water insoluble may also be copolymerized with the amide monomers, but in such instances the amount should not exceed more than about 25 mole percent of the finished copolymer so that the water solubility of the finished copolymer is maintained. Examples of such comonomers are methylvinyl ether, vinylacetate, styrene, methylacrylate, ethylacrylate, ethylene, vinyl chloride, vinylidene chloride, etc.

The polymer in the aqueous polymer solution of this invention increases the efficiency of the recovery of oil by increasing the viscosity of the flooding water whereby "fingering" is greatly reduced and because it is adsorbed on the surfaces of the formation it acts to reduce the permeability, thus partially plugging or closing invaded portions of the producing formation forcing the flooding water or medium into new or uninvaded parts of the formation.

Optionally, as mentioned above, a surfactant or a mixture of surfactants can be employed as an ingredient in the aqueous polymer solution or in the alkali metal hypochlorite solution or in both of the solutions, as desired. Non-ionic, cationic or anionic surfactants can be used in either of the solutions being injected through the injection well or wells into the formation; however, strongly cationic surfactants, which have a tendency to precipiate the polyacrylamide polymers, should not be employed in the polymer solution. A number of examples of surfactants which are useful in the aqueous polymer solution or in the hypochlorite solution are set out below:

NONIONICS

1. Condensation products of fatty acids and derivatives with ethylene oxide, propylene oxide, glycol, or glycerol.
2. Condensation products of alcohols and derivatives with ethylene oxide or propylene oxide.
3. Condensation products of amines, amides or mercaptans with ethylene oxide or propylene oxide.
4. Products formed by reacting ethanolamines with fatty acids.

CATIONICS

1. Amine salts (e.g., hydrochlorides or acetates of octadecylamine, dodecylamine, etc.), also fatty esters of primary, secondary, or tertiary hydroxyalkyl amines.
2. Quaternary ammonium compounds (e.g., tetrasubstituted ammonium compounds in which four separate groups are attached by C—N bonds to the nitrogen atom), pyridinium salts, and other compounds in which the quaternary nitrogen atom is part of a ring system.

ANIONICS

1. Alkyl aryl sulfonates.
2. Fatty alcohol sulfates.
3. Alkyl sulfonates.
4. Sulfated and sulfonated esters and ethers.
5. Sulfated and sulfonated amides and amines.

The concentration of the surfactant in the dilute polymer solution or in the hypochlorite solution can be varied over a wide range. Generally, the concentration of the surfactant in either of the previously mentioned solutions will range from about 0.01 percent up to 5 percent or more by weight depending upon the effectiveness of the particular surfactant being used under the conditions encountered in the producing formation. Larger concentrations of the surfactants may be employed but usually such a procedure is economically unattractive.

Another embodiment of this invention relates to a process for recovering oil from an oil-bearing subterranean formation having an injection means and a production means completed therein comprising the following steps:

a. injecting a dilute aqueous alkali metal hypochlorite solution having dissolved therein an acrylic amide polymer into the injection means, and forcing the said solution through the formation toward the said production means, and b. recovering oil through the said production means.

The alkali metal hypochlorite and polymer solution can be injected continuously into the formation; however, usually a slug of the alkali metal hypochlorite and polymer solution of about 1 to about 50 percent of the pore volume is injected into the formation and upon discontinuing the use of the improved flooding solution, the slug previously injected is displaced through the formation by injection of a second fluid driving medium, such as water, brine, etc.

In the alkali metal hypochlorite and polymer solution the concentration of the alkali metal hypochlorite, which may be sodium, lithium or potassium hypochlorite, is from about 0.01 to about 10 weight percent and, preferably, from about 0.5 to about 2 weight percent, based on the total solution weight while the concentration of the polymer in the same solution will generally range from about 0.005 to about 0.7 weight percent and, preferably, from about 0.01 to about 0.15 weight percent on the same basis. Any of the acrylic amide polymers previously described can be utilized in preparing the hypochlorite and polymer solution. Preferably, the previously described hydrolyzed polyacrylamides are used.

Optionally, the alkali metal hypochlorite and polymer solution can contain from about 0.01 percent up to 5 percent or more by weight based on the total solution weight of one or more of the previously described surfactants.

As previously pointed out, after the required amount of the aqueous polymer solution has been injected into the formation followed by the required amount of the dilute hypochlorite solution in a preferred embodiment of this invention, an aqueous drive medium such as water is then injected into the formation, thus displacing the previously injected solutions and the oil contained in the formation toward the production well. Sufficient pressure is maintained on the injected solutions and the waterflood front through injection wells penetrating the oil-bearing formation to force the liquid flooding medium through the formation and thereby force oil into producing or recovery wells. The aqueous drive medium employed after injection of the polymer solution and the hypochlorite solution can be soft water, brackish water or a brine. Preferably, the water is soft but it can contain small amounts of salts which are characteristic of the subterranean formations being flooded.

The following tests illustrate the advantages of the use of the process of this invention in recovering oil from a subterranean oil-bearing formation.

Two unconsolidated linear, cylindrical sand packs (6.4 cm. in length × 10.75 cm² cross sectional area prepared from 150–200 mesh clean sand, porosity ~30 percent) having permeabilities of 2.3 and 3.0 darcies respectively, were connected in parallel in a standard core testing apparatus in which fluids could be forced lengthwise through the packs. The two sand packs were then saturated with oil (API gravity 23) after which the packs were flooded with a 2 percent by weight solution of sodium chloride until the effluent water-oil ratio was about 150. Next a solution of 250 ppm of partially hydrolyzed polyacrylamide marketed by Dow Chemical Company under the trademark Pusher 700 (molecular weight – about 8,000,000) in a 2 percent by weight sodium chloride solution was flowed through the packs under the same pressure as employed with the 2 percent brine solution. After approximately 5 pore volumes of polymer solution had been passed through the packs, no additional oil had been produced by the polymer flood. Triton X–305, an alkylaryl polyether alcohol nonionic surfactant marketed by Rohm and Haas was added to the polymer in brine solution to give a concentration of 2 ml. of the surfactant (100 percent liquid Triton X–305) per liter of the polymer solution. Approximately 2.5 pore volumes of this solution were passed at the same pressure through the packs and no additional oil was produced. The surfactant-polymer-brine solution was allowed to stand in the packs for two days following which the flow of 2 additional pore volumes of surfactant-polymer-brine solution under the same pressure as previously employed produced no additional oil. In a final operation, a solution composed of 200 ml. of 6 percent by weight of sodium hypochlorite diluted to one liter with distilled water, was flowed through the sand packs and a substantial additional amount of oil was produced.

In a second series of tests sandstone cores in the form of cylinders 1 inch in diameter and 7 inches long are mounted in standard core testing apparatus in which fluids could be forced through the cores lengthwise. Each core is first flushed with a 2 percent by weight sodium chloride brine and then is flooded to saturation with a crude oil (API gravity 23). The oil-containing cores are again flooded with about 30 ml. of the aqueous brine to displace the mobile oil and the oil remaining in the core at this point is defined as "residual oil", i.e., oil remaining after continued flooding with brine yields no additional oil. The first core is then flooded with a 30 ml. solution of 200 ppm of a partially hydrolyzed polyacrylamide marketed by the Dow Chemical Company under the trademark Pusher 500 (molecular weight – about 4,000,000) in a 2 percent by weight sodium chloride solution following which 25 ml. of a solution of about 3 percent by weight of potassium hypochlorite is passed through the same core with the result that a substantial amount of the residual oil is recovered. When an identical flooding operation is carried out except that the step of flooding with the potassium hypochlorite solution is omitted, only a small fraction of the residual oil produced in the first instance is obtained.

In a third series of tests two linear, cylindrical sand packs (6.4 cm. in length × 10.75 cm² in cross sectional area prepared from 100–120 mesh clean sand, porosity ~30 percent) connected in parallel and of different permeabilities were first saturated with oil (Brelum Field, Duval County, Tex., API gravity 23) and 2 percent sodium chloride solution was flowed through them at a pressure of 5 psig and at 25°C. The combined effluent from the packs was collected in centrifuge tubes and the oil produced was separated from the water and measured. Initially 20.9 ml. of 2 percent by weight aqueous sodium chloride solution was passed through the sand packs and the combined effluent contained 20.70 ml. of oil. Next, 20.2 ml. of an aqueous 2.0 percent sodium chloride solution containing 250 ppm of partially hydrolyzed polyacrylamide marketed by Dow Chemical Company under the trademark Pusher 700 was flowed through the sand packs and from the combined effluent additional oil in the amount of 2.90 ml. was recovered. In a third flooding operation, a total of 290.8 ml. of 2 percent aqueous sodium chloride solution was passed through the sand packs and the combined effluent contained 19.7 ml. of oil; however, at the conclusion of this phase the water/oil ratio was infinity, indicating that no additional oil was being displaced. In a final step when 196.1 ml. of a solution of the same hydrolyzed polyacrylamine employed in the second step in a 2 percent aqueous sodium chloride solution to which 2 ml. of Triton X–305, an alkylaryl polyether alcohol nonionic surfactant marketed by Rohm and Haas, and 200 ml. per liter of 6 percent by weight aqueous solution of sodium hypochlorite had been added, was flowed through the sand packs the combined effluent contained 6.2 ml. of additional oil.

This experiment shows that a significant increase in the volume of oil recovered can be achieved utilizing an aqueous solution of partially hydrolyzed polyacrylamide, surfactant and hypochlorite of this invention.

What is claimed is:

1. A process of recovering oil from an oil-bearing subterranean formation having an injection means and a production means completed therein which comprises:
   a. injecting a slug of a dilute aqueous polymer solution through the injection means into the subterranean formation,
   b. injecting a slug of a dilute aqueous alkali metal hypochlorite solution containing a surfactant through the injection well into the subterranean formation, and
   c. recovering oil through the production means.

2. The process of claim 1 wherein the said polymer is a high molecular weight polyacrylamide.

3. The process of claim 1 wherein the said polymer is a high molecular weight polyacrylamide having not less than 2 percent of the carboxamide groups hydrolyzed to carboxyl groups.

4. The process of claim 1 wherein the concentration of the said polymer in the aqueous polymer solution is about 0.005 to about 0.7 percent by weight.

5. The process of claim 1 wherein the concentration of the alkali metal hypochlorite in the dilute alkali metal hypochlorite solution is from about 0.01 to about 10.0 percent by weight.

6. The process of claim 1 wherein the said alkali metal hypochlorite is selected from the group consisting of sodium, lithium and potassium hypochlorites.

7. The process of claim 1 wherein the said alkali metal hypochlorite is sodium hypochlorite.

8. The process of claim 1 wherein the said polymer is polyacrylamide having a molecular weight greater than 1,000,000.

9. The process of claim 1 wherein in a separate step ($b_1$) subsequent to step (b) an aqueous drive fluid is injected through the injection means to drive the hypochlorite and polymer solutions and the oil within the formation toward the production means.

10. The process of claim 9 wherein steps (a), (b) and ($b_1$) are repeated.

11. The process of claim 1 wherein the said aqueous polymer solution contains a surfactant.

12. The process of claim 1 wherein the steps (a) and (b) are repeated.

13. The process of claim 1 wherein the volume of hypochlorite solution injected in claim 1 is about 50 percent of the volume of the polymer solution.

14. The process of claim 1 wherein a volume of about 1 to about 50 percent of the pore volume of the said polymer solution is employed.

15. The process of claim 1 wherein a volume of about 1 to about 50 percent of the pore volume of the said hypochlorite solution is employed.

16. A process of recovering oil from an oil-bearing subterranean formation having an injection means and a production means completed therein which comprises:
    a. injecting a dilute aqueous alkali metal hypochlorite solution having dissolved therein an acrylic amide polymer into the injection means and forcing the said solution through the formation toward the said production means, and
    b. recovering oil through the production means.

17. The process of claim 16 wherein the concentration of the said polymer is the aqueous alkali metal hypochlorite solution is about 0.005 to about 0.7 percent by weight.

18. The process of claim 16 wherein the said polymer is polyacrylamide of molecular weight greater than 1,000,000 having not less than 2 percent of the carboxamide groups hydrolyzed to carboxyl groups.

19. The process of claim 16 wherein the said alkali metal hypochlorite is sodium hypochlorite.

20. The process of claim 16 wherein the concentration of the said hypochlorite in the alkali metal hypochlorite solution is about 0.01 to about 10.0 percent by weight.

21. The process of claim 16 wherein the said dilute aqueous alkali metal hypochlorite solution contains a surfactant.

* * * * *